(12) United States Patent
Quisel et al.

(10) Patent No.: US 9,350,636 B2
(45) Date of Patent: May 24, 2016

(54) SYSTEM AND METHOD FOR DETECTING SPAMMERS IN A NETWORK ENVIRONMENT

(71) Applicant: MATCH.COM, L.L.C., Dallas, TX (US)

(72) Inventors: Tom R. Quisel, New York, NY (US); Anson Wang, New York, NY (US)

(73) Assignee: MATCH.COM, LLC, Dallas, TX (US)

( * ) Notice: Subject to any disclaimer, the term of this patent is extended or adjusted under 35 U.S.C. 154(b) by 109 days.

(21) Appl. No.: 14/048,959

(22) Filed: Oct. 8, 2013

(65) Prior Publication Data

US 2015/0100678 A1   Apr. 9, 2015

(51) Int. Cl.
*G06F 15/173*   (2006.01)
*H04L 12/26*   (2006.01)
*H04L 12/58*   (2006.01)

(52) U.S. Cl.
CPC ............... *H04L 43/10* (2013.01); *H04L 51/12* (2013.01)

(58) Field of Classification Search
USPC .................................................. 709/206, 224
See application file for complete search history.

(56) References Cited

U.S. PATENT DOCUMENTS

| 8,001,195 | B1 * | 8/2011 | Kalinin | ........................ 709/206 |
| 2009/0322597 | A1 | 12/2009 | Medina-Herrero et al. | |
| 2010/0246576 | A1 | 9/2010 | Bustamente | |
| 2010/0283827 | A1 | 11/2010 | Bustamente | |
| 2010/0285856 | A1 | 11/2010 | Thomas | |
| 2010/0287286 | A1 | 11/2010 | Bustamente | |
| 2011/0313647 | A1 | 12/2011 | Koebler et al. | |

OTHER PUBLICATIONS

Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).
Zoosk Customer Support, "How Do I Video Chat?" available online at <URL https://zoosk.zendesk.com/entries/20513017-how-do-i-video-chat> Oct. 7, 2011 (3 pages).

* cited by examiner

*Primary Examiner* — Michael Won
*Assistant Examiner* — Karina J Garcia-Ching
(74) *Attorney, Agent, or Firm* — Patent Capital Group (57) ABSTRACT

A method is provided in one example embodiment and includes processing a first text created by a user into a first bag of words, the first bag of words comprising a list of words that appear in the text, each of the words having associated therewith a number representing a number of times the associated word appears in the text; and computing a similarity between the first bag of words and at least one second bag of words. The method further comprises comparing the computed similarity with a threshold; and determining that the user is a spammer if the computed similarity bears a first relationship with the threshold.

17 Claims, 11 Drawing Sheets

FIG. 2D match.com | My Match | Search | My Profile | Email | Advice:

Sign In ☐ Account Settings ☐ How Match Works ☐ Help ☐

Click here to subscribe to Match.com today!

Sign up to see her profile.

Ready to learn more about who LadyDi520 is and who she is looking for? Sign up for free below!

LadyDi520
32-year old
Dallas TX, US
Active within 24 hours

Choose a username: [         ]
Choose a password: [         ]
Your email address: [         ]
I am a: ○ Man  ○ Woman
Seeking: ○ Man  ○ Woman
Between ages: [25 ▼] and [33 ▼]
Your birthday: [Month ▼] [Day ▼] [Year ▼]
Your country: [United States ▼]
Zip / postal code: [         ]
Where did you hear about Match.com: [Choose below ▼] (Optional)

☑ Send me photos of my compatible matches. By checking this box, I also consent to receive from Match.com special offers and promotions relating to Match.com and select third parties, as well as tips and announcements on how I can better use the Match.com service.

☐ Send me special offers and partner promotions. Receive exclusive deals and timely updates sent to you by select Match.com partners.

I am at least 18 years old and have read and agree to Match.com's terms of use and privacy policy.

FIG. 2G match.com  Home  Search ▾  Matches ▾  Connections ▾  Messages ▾  Profile ●  Account ▾

Welcome lisdfkidsasifhdk  [mobile]  ⊕ invite friends

Find Love. Guaranteed. GO >>  [SUBSCRIBE]  No one can find you until you finish your profile. Complete yours now >>

ABOUT ME
ABOUT MY DATE
APPEARANCE
BACKGROUND/VALUES >
LIFESTYLE
IN MY OWN WORDS
———————
PHOTOS

SYNAPSE INTELLIGENT MATCHING

HER BACKGROUND/VALUES  Be honest about your deal breakers, and careful not to be too limiting.

76%

UPLOAD PHOTOS

Ethnicities:
☑ No Preference
☐ Asian            ☐ Black / African descent
☐ East Indian      ☐ Latino / Hispanic
☐ Middle Eastern   ☐ Native American
☐ Pacific Islander ☐ White / Caucasian
☐ Other

Religion:
☑ No Preference
☐ Agnostic         ☐ Atheist
☐ Buddhist / Taoist ☐ Christian / Catholic
☐ Christian / LDS  ☐ Christian / Protestant
☐ Hindu            ☐ Jewish
☐ Muslim / Islam   ☐ Spiritual but not religious
☐ Other            ☐ Christian / Other

Education level:  ☑ No Preference
☐ High School      ☐ Some College
☐ Associates degree ☐ Bachelors degree
☐ Graduate degree  ☐ PhD / Post Doctoral

Languages spoken:  ☐ No Preference
☑ English  ☐ French  ☐ Spanish
more >>

[SAVE & CONTINUE >>]

FROM FIG. 2H favorite hot spots:
I love Olive Garden (cheap date) LOL then karaoke, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule sense of humor: Clever: Nothing's better than a quick-witted comeback, Friendly: I'll laugh at anything sports and exercise: No Answer common interests: Cooking, Dining out, Movies/Videos, Music and concerts, Watching sports

Lifestyle exercise habits: Don't exercise
daily diet: Meat and potatoes
smoke: Daily
drink: Social drinker, maybe one or two
job: Other profession
I am a bartender right now, I used to be a medical secretary but got tired of the 9-5 taking a break
income: $25,001 to $35,000
my place: Live with pets
have kids: Yes, and they live away from home
  how many: 3
want kids: No Answer
pets:
  I have: Dogs, Fish
  I don't have, but like: Cats
  I don't like: Reptiles, Birds, Exotic pets, Gerbils / Guinea Pigs / Etc., Fleas, Other

Background / Values ethnicity: White / Caucasian
faith: Christian / Other
education: Some college
Ohio State for 2 years

FROM FIG. 2I

| | |
|---|---|
| languages: | English |
| politics: | Conservative |

About My Date

| | |
|---|---|
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |

Fun
Boot scootin' across gritty floorboards, the band playing what we'll soon remember as "our song"

Photos

FIG. 3

SYSTEM AND METHOD FOR DETECTING SPAMMERS IN A NETWORK ENVIRONMENT

TECHNICAL FIELD

This disclosure relates in general to the field of communications and, more particularly, to a system and a method for detecting spammers in a network environment.

BACKGROUND

Communications network architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

In the case of an online dating service, for example, an end user will typically be prompted to specify a variety of preferences to be used in matching the end user with other end users in a particular online dating community. The information each end user provides about him or herself may be viewed by other end users in the online community in determining whether to interact with that end user. In certain cases, the actual dating platform can participate in matching activities. This interventionist involvement can often spur or provoke new relationships being formed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes processing a first text created by a user into a first bag of words, the first bag of words comprising a list of words that appear in the text, each of the words having associated therewith a number representing a number of times the associated word appears in the text; and computing a similarity between the first bag of words and at least one second bag of words. The method further comprises comparing the computed similarity with a threshold; and determining that the user is a spammer if the computed similarity bears a first relationship with the threshold. The processing a first text into a first bag of words may comprise processing each of a plurality of first texts into a first bag of words. In some embodiments, the second bag of words comprises a plurality of second bags of words and the computing a similarity between the first bag of words and at least one second bag of words comprises computing a similarity between each of the first bags of words and a most similar one of the second bags of words. The method may further comprise computing an average of the similarities.

In some embodiments, the comparing the computed similarity with a threshold comprises comparing the computed average similarity with the threshold. The second bag of words may be associated with a spam text. The first text may comprise a profile description for the user or a message from the user to another user.

Example Embodiments

Figure 1:
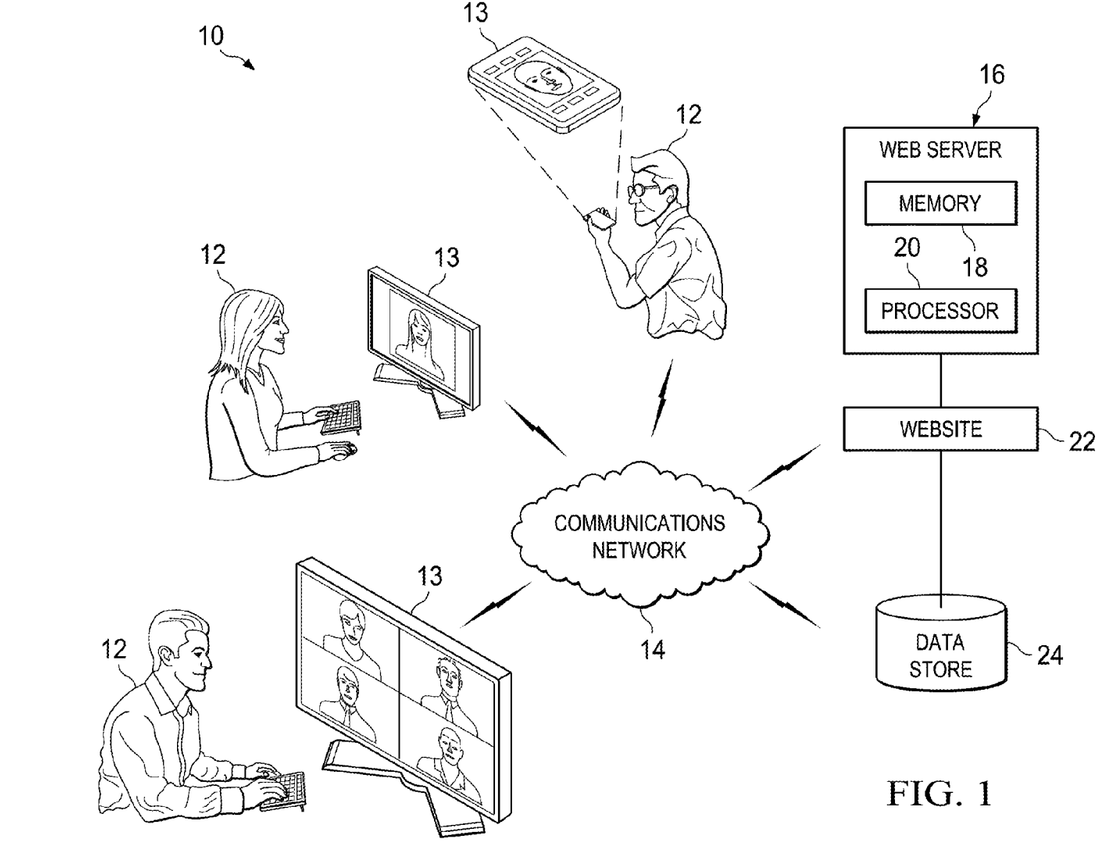
FIG. 1 is a network diagram showing an operating environment of the present disclosure in accordance with one embodiment of the present disclosure.

FIG. 1 is a simplified block diagram of a system 10 for facilitating an online dating scenario in a network environment. In other embodiments in which communications or matching is valuable, system 10 can be leveraged to identify and to evaluate suitable candidates in other areas (e.g., hiring/employment, recruiting, real estate, general person searches, etc.). FIG. 1 includes multiple end users 12 and endpoints 13, a communications network 14, a web server 16 comprising memory 18 and a at least one processor 20, a website 22, and a data store 24. Data store 24 may be any type of mechanism for storing data, including but not limited to one or more files, databases, memory devices, mass storage devices, data centers, etc. System 10, users 12 interact with web server 16 via endpoints 13, each of which comprises an appropriate user interface for interacting with web server 16 via website 22 for facilitating functions and features described herein. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10. Ancillary components to such a comprehensive process may involve pre-date profiles, post-date follow-ups, and a myriad of other significant features, some of which are outlined in detail below.

End users 12 may include a variety of types of end users, such as clients, customers, prospective customers, or entities wishing to participate in an online dating scenario and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data, as used herein in this document, refers to any type of numeric, voice, video, or script data, or any other suitable information in any appropriate format that may be communicated from one point to another.

End users 12 may access the aforementioned data via endpoints 13, which may be inclusive of devices used to initiate a communication. Note that the broad term "user" encompasses any type of node or user device, or any type of endpoint discussed herein. Additionally, the term "user" can further include any type of profile to be used in the system discussed herein. Hence, the term "user" can include (but is not limited to) elements such as a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of initiating voice, audio, or data exchanges within communication system 10. The endpoints may be inclusive of a suitable interface to the end user 12, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

A user may employ any device capable of operating as an endpoint 13 to connect to communications network 14 via wire, wireless, cellular, satellite link or other suitable interfaces. Web server 16, which as previously noted includes memory 18 and at least one processor 20, hosts website 22 and has access to transmit and receive user or presence data (e.g., user profile data, user and/or user endpoint data, user contact data) from database 24. Presence data may be collected, aggregated, and utilized as required to facilitate communications between endpoints 13 over communications network 14 or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. Communications network 14 represents an Internet architecture in a particular embodiment of the present disclosure, which provides end users 12 with the ability to electronically execute or to initiate actions associated with finding a potential match candidate. Alternatively, communications network 14 could be a plain old telephone system (POTS), which end user 12 could use to perform the same operations or functions. Such transactions may be assisted by management associated with website 22 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a server that is operable to receive and to communicate information to one or more end users 12. In a generic sense, web server 16 can implement a computer-implemented matching system that provides a framework for suitable matching activities. Alternatively, web server 16 may be any switch, router, gateway, cache, server blade, software, processor, proprietary component, object, module, or element (or any combination of these) operable to facilitate communications involving end user 12. Web server 16 may be integrated with database 24 and/or website 22, where any one or more of these elements may share or otherwise coordinate the activities discussed herein.

In one particular embodiment, web server 16, via interaction with database 24 and/or in conjunction with website 22, is engaged in facilitating interaction(s) between parties interested in seeking a romantic partner (i.e., online dating). For example, website 22 can be online dating service provider www.Match.com, www.Chemistry.com, or any other suitable provider. In certain example scenarios, a given end user may pay a fee for a subscription-based service (and potentially, only those users would qualify to be eligible to participate in events in certain example implementations, although other example embodiments involve non-members being eligible for participation). Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, direct mailings, etc. It can be appreciated that online commerce can be generated by a plethora of marketing tools and any such tools can readily cooperate with the operations of the present disclosure.

At this point, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-2J illustrate example screen shots that may be provided in the online dating process to facilitate presentation of information to and gathering of information from member end users. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2A:
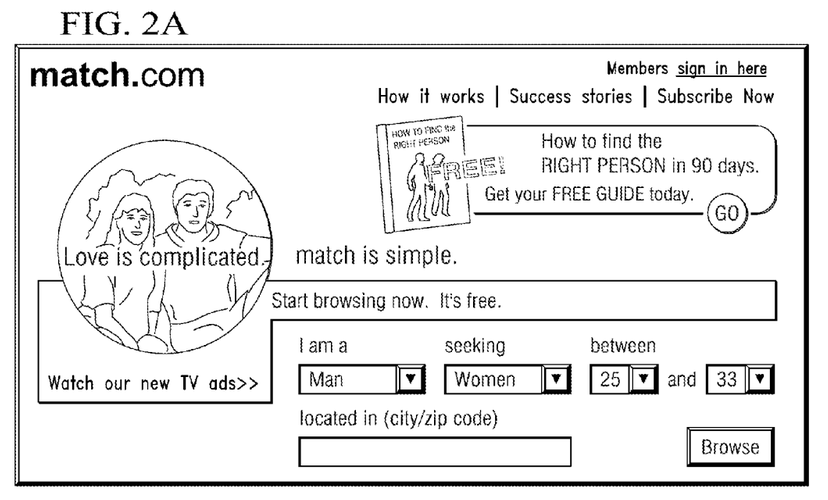
FIGS. 2A-J are simplified screen shots of an example protocol for participating in an on-line dating service in accordance with one embodiment of the present disclosure.
Figure 2B:
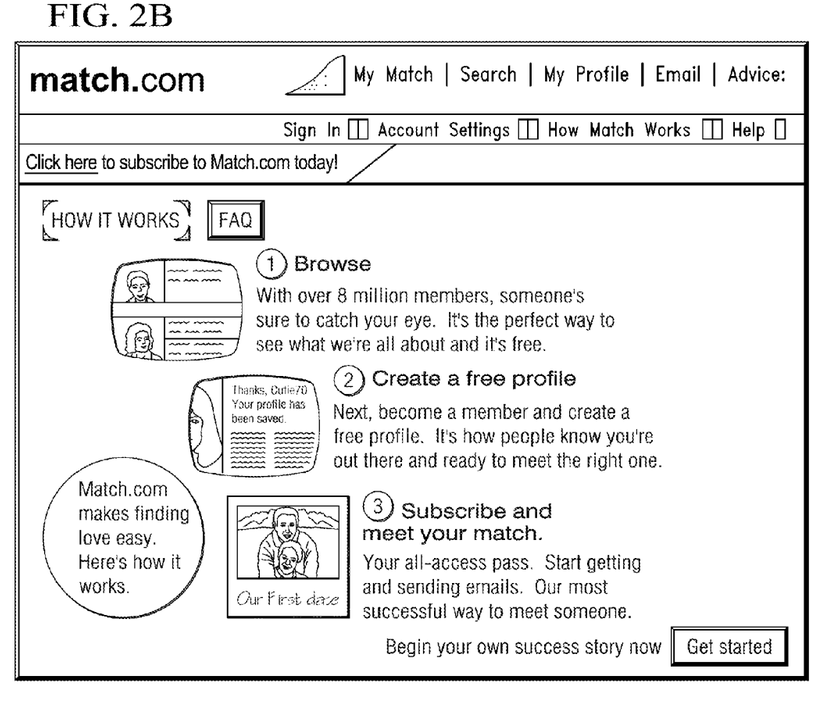

FIG. 2A is an example screen shot of a home page from which an interested end user may begin his/her journey. In the illustrated example, the home page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the home page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view pictures of members along with summaries of the members' profiles. After browsing the website, the end user may decide to create a free profile. Once the end user browses the website and creates a profile, the end user may opt to subscribe to the service and receive information from/about others who are part of the online community. For purposes of example and ease of explanation, it will be assumed for the remainder of the discussion of FIGS. 2A-2D that the potential new end user investigating and ultimately subscribing to the service is a male named "Tom" who is interested in finding a female match.

Figure 2C:
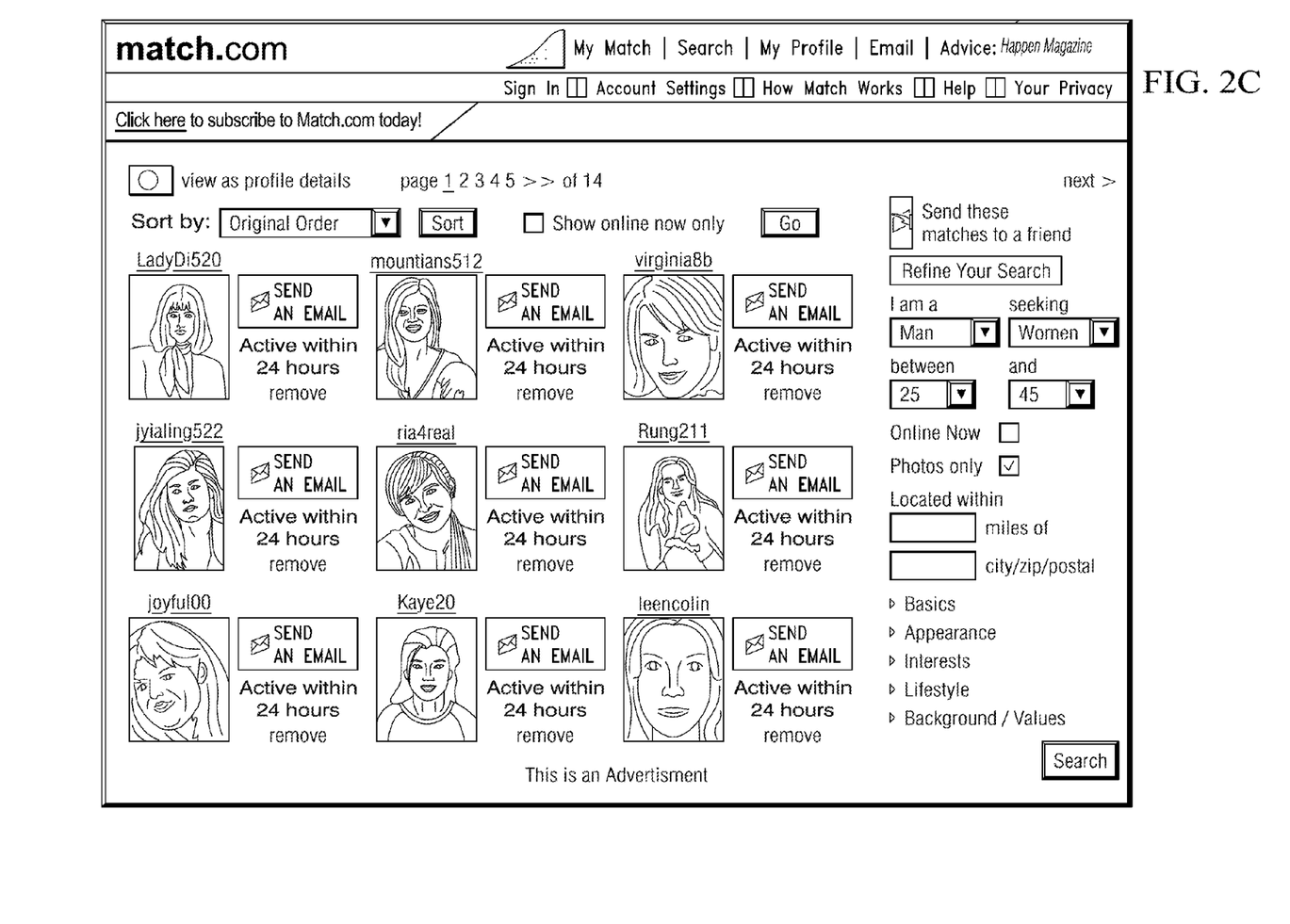
Figure 2D:
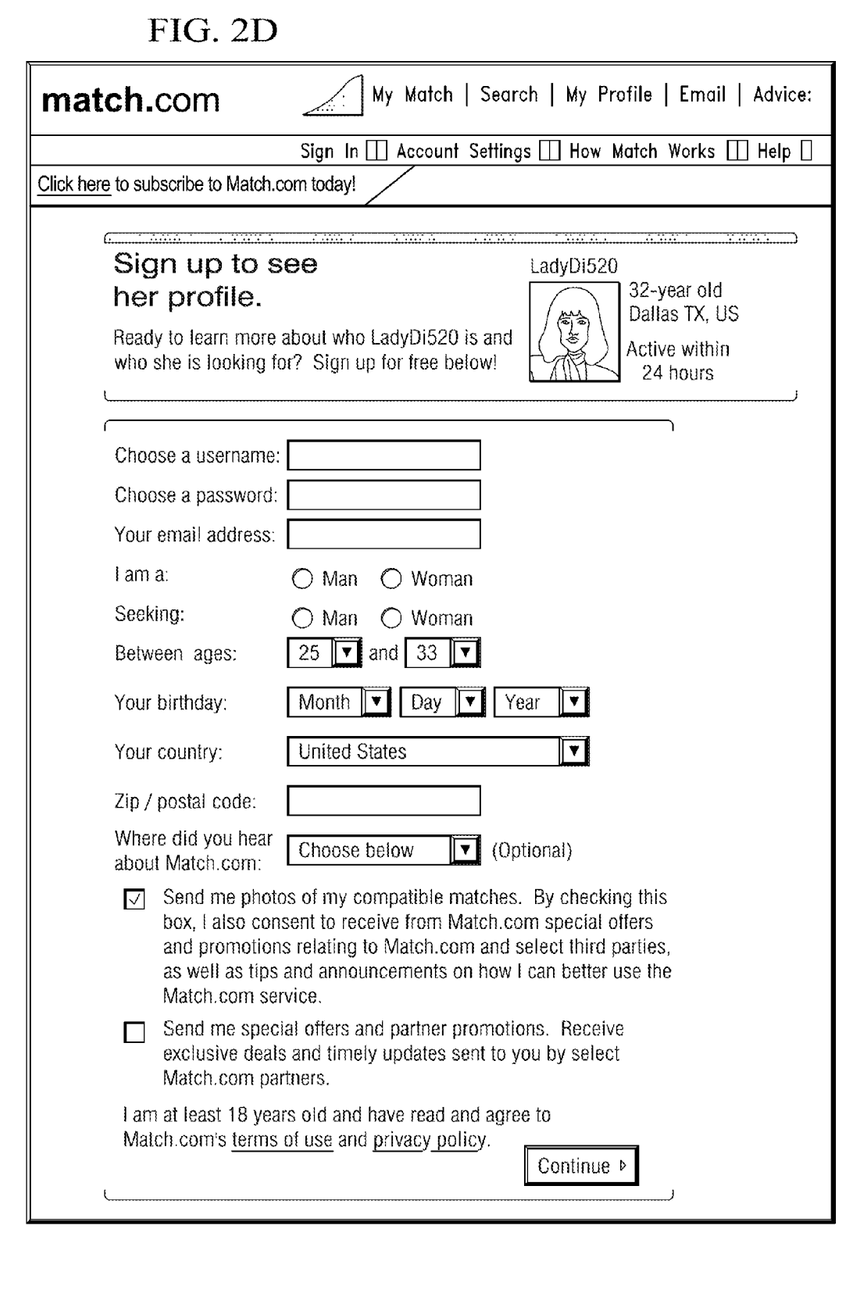

FIG. 2C is an example screen shot of a number of profiles that may be viewed by Tom during the browsing phase described above. In the context of this shot, Tom may be simply browsing. Assuming Tom has decided he would like to know more about one of the members whose profile is presented in FIG. 2C, he may click on the picture associated with the selected profile. For example, assuming Tom has decided he would like more information about "LadyDi520", clicking on her picture results in his being directed to a web page as shown in FIG. 2D, where he is solicited to sign up for the online dating subscription such that he can effectively contact his candidate selection. It will be noted that the information solicited using the page shown in FIG. 2C may be used in selecting matches for Tom. The information may also be displayed on Tom's profile or summary thereof presented to other users to assist those users in determining whether they are interested in interacting with him.

Figure 2E:
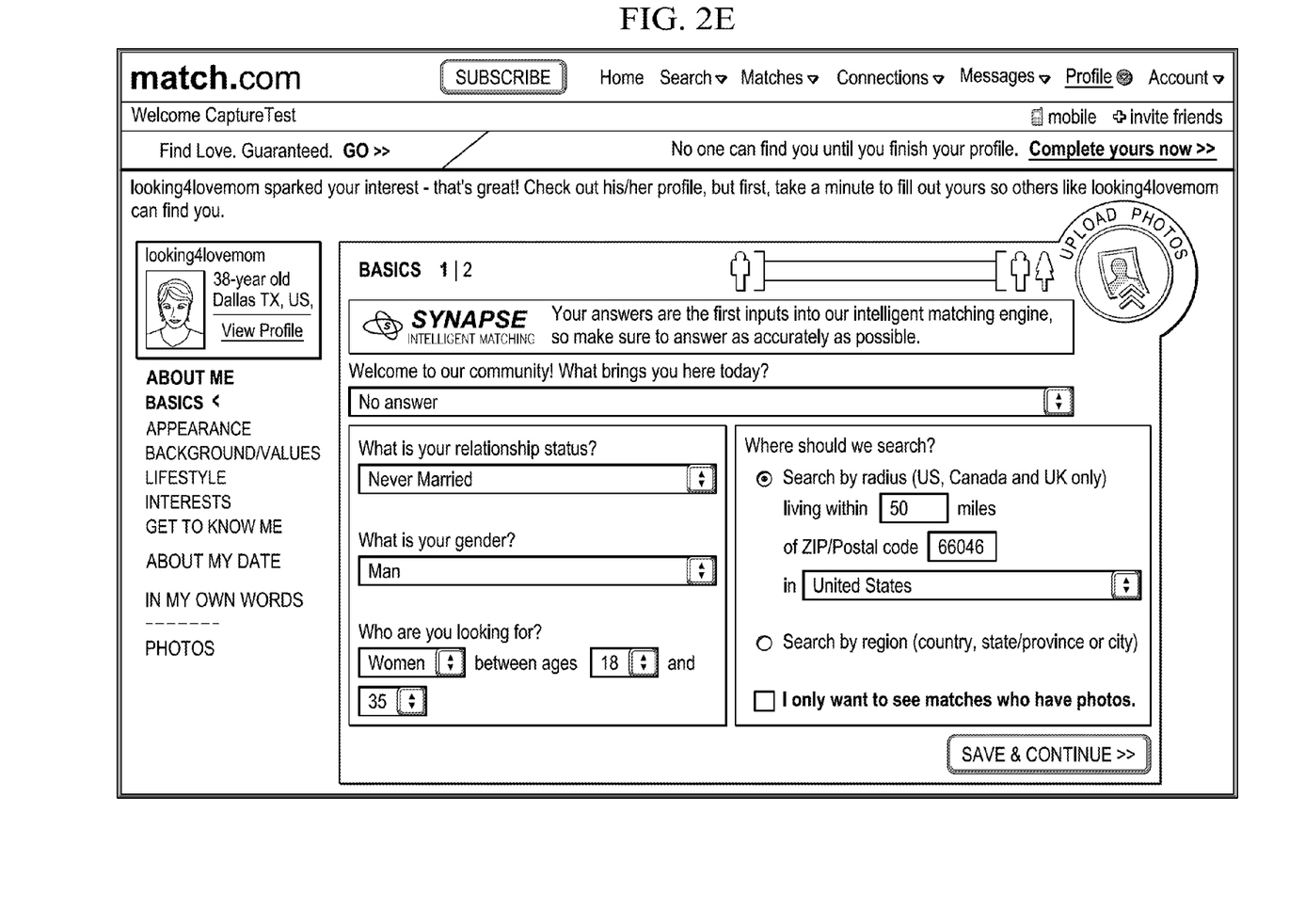
Figure 2F:
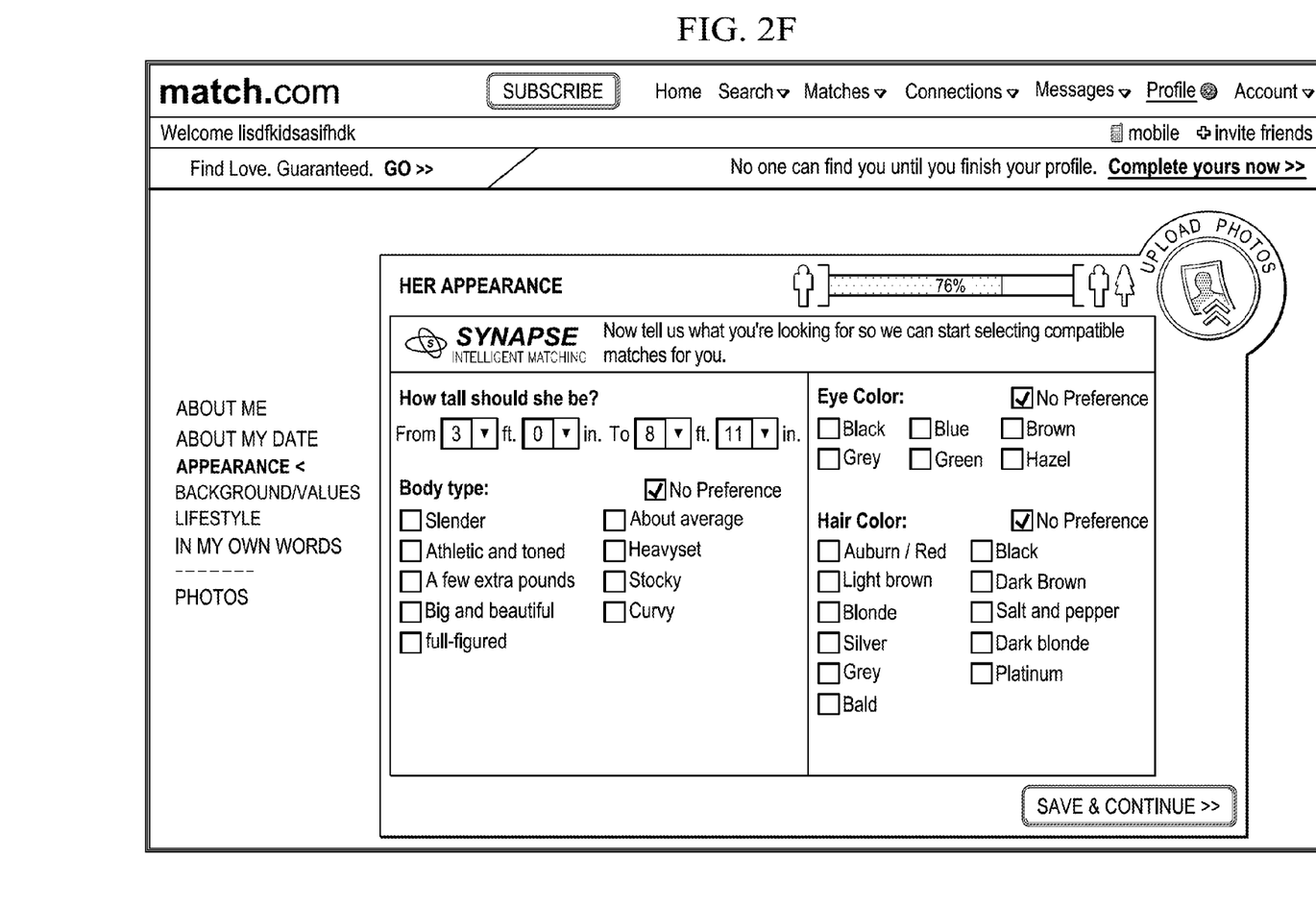
Figure 2G:
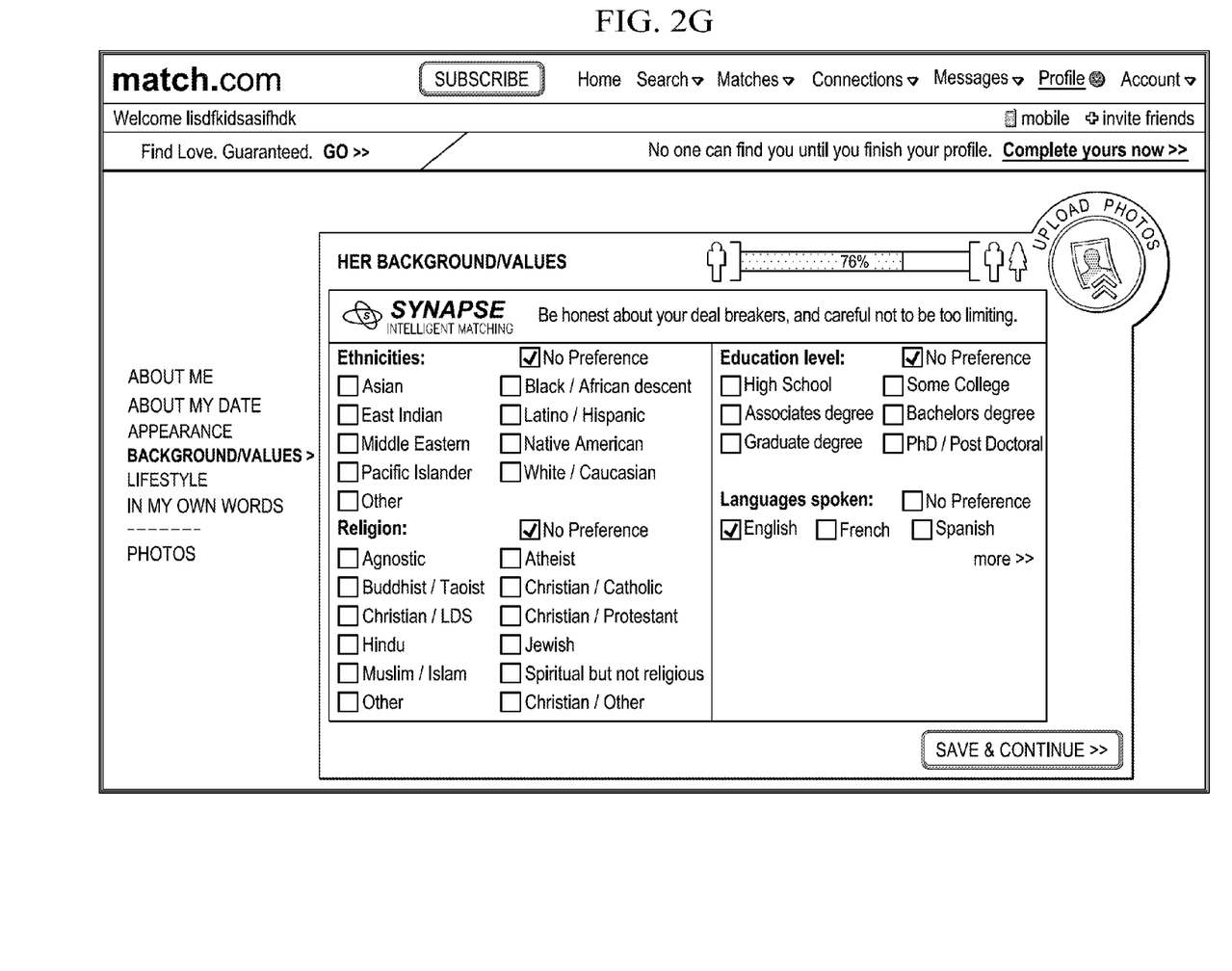

FIGS. 2E-2G illustrate various screen shots comprising a user information collection process in accordance with one embodiment. Using the web pages illustrated in FIGS. 2E-2G, system 10 collects a variety of information from an end user, including, but not limited to, basic information about the end user (FIG. 2E), as well as information about the type person the end user would be interested in dating, including information about a potential date's physical appearance (FIG. 2F) and background and values (FIG. 2G). It will be recognized that the information collected using the web pages illustrated in FIGS. 2E-2G is illustrative only and that any type/amount of information may be solicited in the illustrated manner.

Figure 2H:
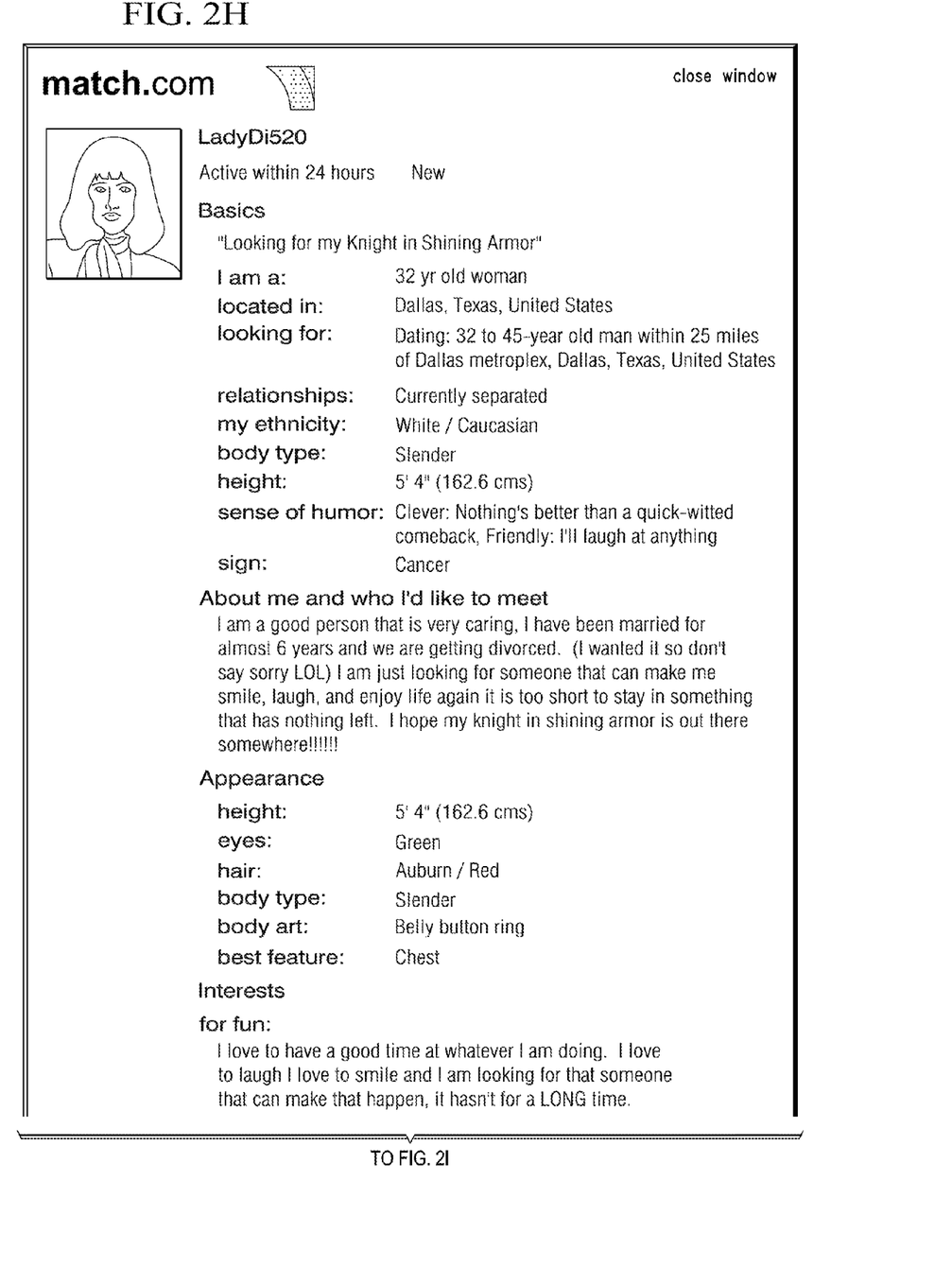
Figure 2I:
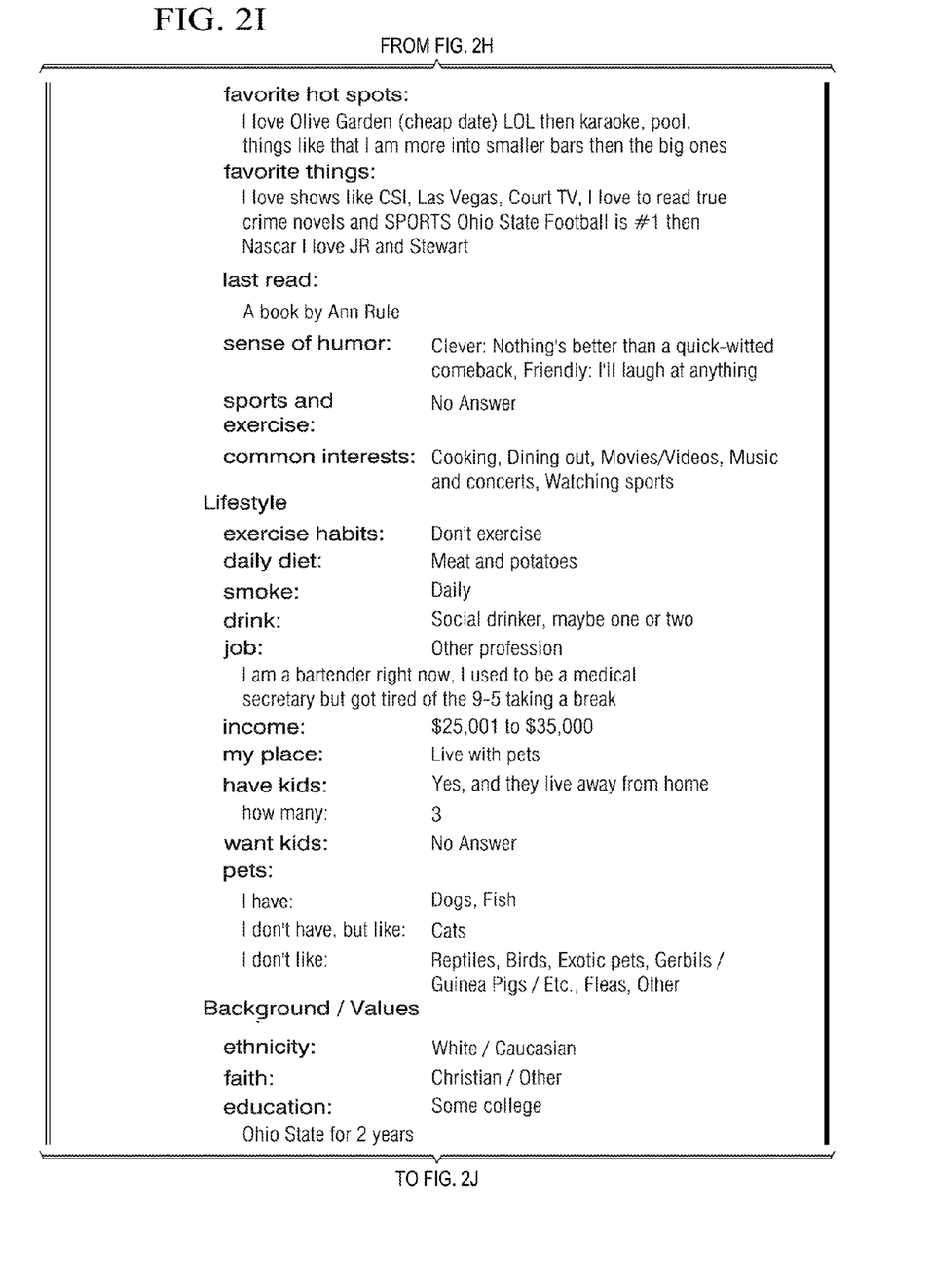
Figure 2J:
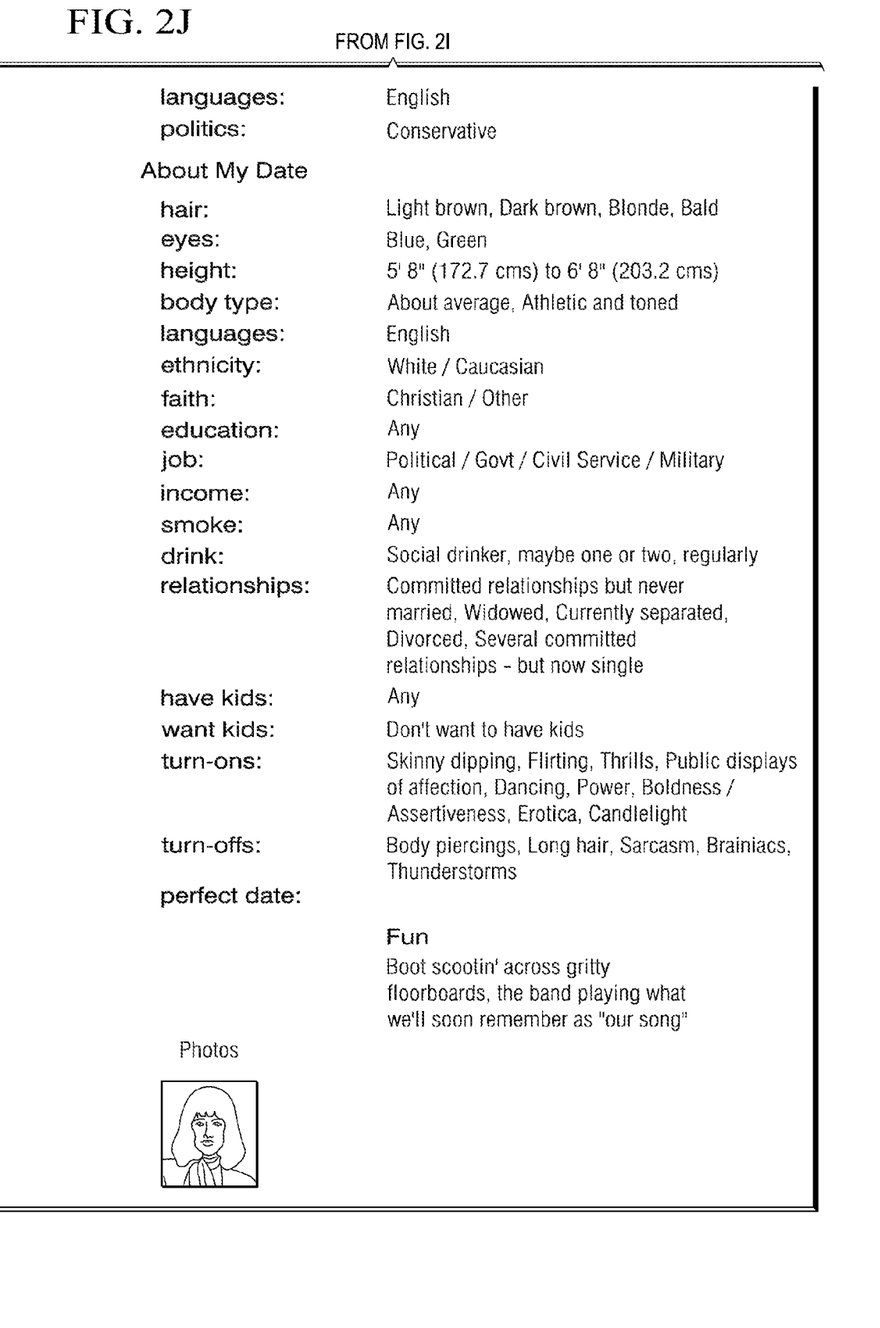

FIGS. 2H-2J are example screen shots of the full profile of LadyDi520, the picture Tom selected while browsing. In illustrated profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. The profile may include a photo, biographical information (e.g., gender, age, location, relationship status, etc.), physical information (e.g., height, weight, hair and eye color, etc.), interests (e.g., hobbies, "favorites," etc.), lifestyle information (e.g., exercise habits, employment, smoking/drinking habits, etc.), and background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In some embodiments, a full profile, including the profile information provided by the end user and stored in the system, is displayed to interested viewers; in other embodiments, only a summary or subset of the profile information is displayed.

In one embodiment, the system 10 may include a feature referred to herein as a spammer detection feature. As will be described in detail below with reference to FIG. 3, one objective of the spammer detection feature is to detect and block or otherwise address spam messages or profile descriptions that comprise degenerative grammar attacks designed to overload and thereby debilitate the system 10. A user who creates such a spam message/profile description may also be blocked and/or otherwise dealt with to prevent such attacks on the system 10 from continuing.

Figure 3:
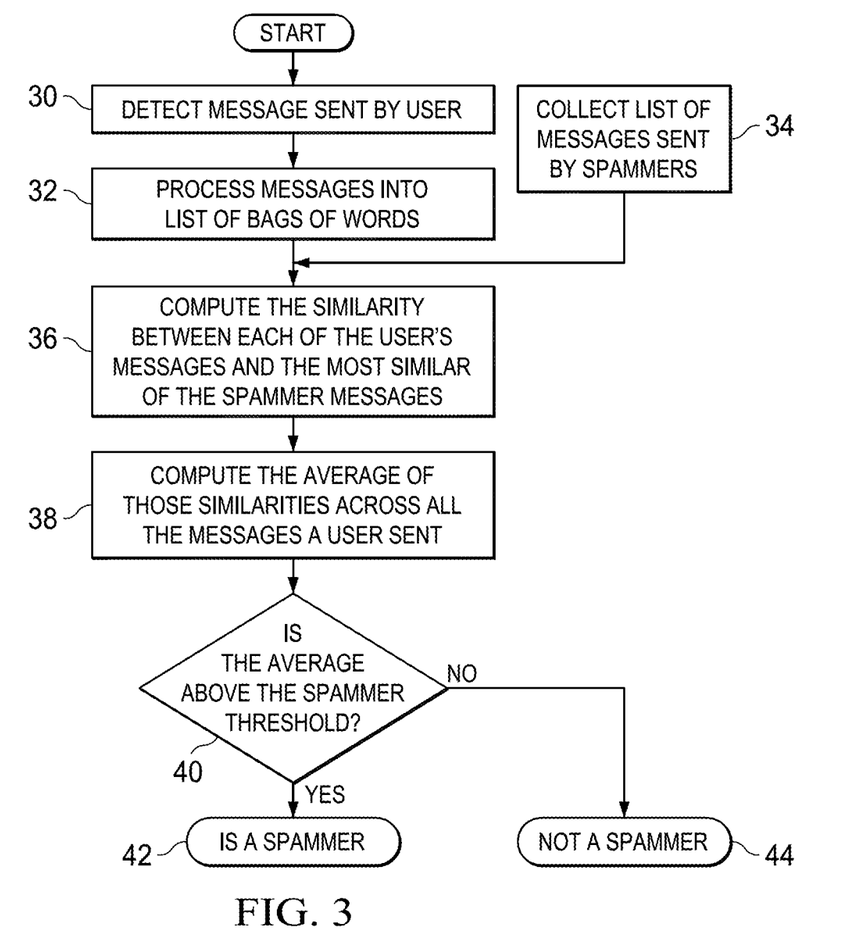
FIG. 3 is a flow diagram illustrating logic implemented by a spammer detection feature of an on-line dating service, such as illustrated in FIGS. 1-2J, in accordance with one embodiment of the present disclosure.

FIG. 3 is a flowchart illustrating logic implemented by a spammer detection feature in accordance with one embodiment. In one embodiment, the logic for implementing the spammer detection feature (potentially to be embodied in software) could be provided in web server 16. Referring to FIG. 3, in step 30, the spammer detection feature detects a series of messages sent by a user. It will be recognized that step 30 may be performed for every series of messages sent by every user of the system 10. Additionally, for ease of explanation, the logic illustrated in FIG. 3 will be described with reference to a series of messages sent by a user; however, the logic described herein may be equally applicable to one or more profile descriptions, or a combination of messages and profile descriptions, submitted by a user. In step 32, the messages detected in step 30 are each processed into a "bag of words." As used herein, the phrase bag of words refers to representation of text (e.g., a message or a profile description) as an unordered collection of words, irrespective of word order and grammar. As will be illustrated below, a bag of words comprises a list of words, each word having associated therewith a number representing the number of times the word appears in the text. In step 34, a collection of bags of words representing messages (or profile descriptions) known to be spam and perhaps collected over time are accessed. In one embodiment, the collection of bags of words is stored as an array in a memory device of the system 10. In step 36, a similarity factor between the each of messages detected in step 30 and the most similar of the messages known to be spam represented in the collection of the bag of words is calculated. In step 38, the average of the similarities calculated in step 36 is computed. In step 40, a determination is made whether the average computed in step 38 is above a designated threshold, referred to as the "spammer threshold." If so, in step 42, the user is deemed a spammer, at which point appropriate action (i.e., blocking of the user from the system 10) may be performed. If it is determine instep 40 that the average computed in step 38 is not above the spammer threshold, execution proceeds to step 44, in which the user is deemed not to be a spammer and no particular action need be taken.

The following example provides further illustration of the process shown in FIG. 3. To create a bag of words for a text, the string of words comprising the text is used to create a dictionary mapping each word to the number of times the word appears in the string. This process may be referred to as "bagification" and is the process performed in step 32. In one embodiment, bagification is case-insensitive. Taking for the sake of example the string "The cat ate the dog," bagification results in a set:

{"the":2, "cat":1, "ate:1, "dog":1}

The comparison process, performed in step 34, may be performed as follows. Two strings for comparison are "bagified". The result of this step will be two sets of words, or "bags". As noted above, in each bag, each word maps to the number of times it appears in the string. For each word in the first bag, a determination is made whether the word exists in the second bag. If not, no action is taken; otherwise, the number to which the word is mapped in each bag is compared and the smaller number (which represents the number of times the word appears in both strings) is used as the compare count. For example, assuming string 1 is "The cat at the dog", such that bag 1 is {"the":2, "cat":1, "ate:1, "dog":1} and further assuming string 2 is "The cat at the little bird", such that bag2 is {"the":2, "cat":1, "ate:1, "little":1, "bird":1}, the compare count is {"the":2, "cat":1, "ate":1}.

The compare counts are summed into a sum of counts, which is entered into the following equation:

$$\text{similarity} = (2 \cdot (\text{sum of counts})) / ((\text{number of words in first string}) + (\text{number of words in second string}))$$

As applied to the above example the similarity is (2*(2+1+1)/((2+1+1+1)+(2+1+1+1+1)), or 0.727. The similarity is compared to a spammer threshold. In one embodiment, the spammer threshold may be 0.8, such that any message with a similarity higher than 0.8 is deemed to have a high probability of having been sent by a spammer.

To create the array used in step 34, common messages or profile descriptions known to have been sent by spammers, or similar to messages/descriptions that would be submitted by spammers, are bagified as described in detail above. The bags of words representing known spam are stored, e.g., in an array in a storage device in or accessible by the system 10. Questionable messages/profile descriptions sent via or created within the system 10 are bagified. It will be recognized that all messages/profile descriptions may be processed in this manner; alternatively, only certain ones of new messages/profile descriptions identified as having a high likelihood of being sent/crated by a spammer will be processed. For each bag in the array of bags, the unchecked bag is compared and the highest similarly is identified. This high similarity is compared with the threshold.

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in any aspect of the online dating process described herein, such as establishing a personality profile, for example, any suitable question format can be employed. Example formats include a Yes/No format, a multiple choice question format, a short answer format, a true/false format, etc. Other formats can readily be used in order to achieve the desired responses and solicit the appropriate data.

Note that in certain example implementations, the spam detection functions outlined herein, such as those carried out by web server 16 and/or provided as an application for an endpoint being operated by an end user (e.g., a mobile application for an iPhone™), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the spam detection activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the spam detection activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    processing a first text created by a user using an online service into a first bag of words, the first bag of words comprising a list of words that appear in the first text, each of the words having associated therewith a number representing a number of times the associated word appears in the text;
    computing a similarity between the first bag of words and at least one second bag of words, wherein the computing comprises, for each word in the first bag of words, determining a compare count comprising a minimum number of times the word appears in each of the first bag of words and the second bag of words and adding the compare count to a sum of counts, wherein the computed similarity comprises two times the sum of counts divided by the total number of words in the first bag of words and the second bag of words;
    comparing the computed similarity with a threshold; and
    determining that the user is a spammer and preventing the user from using the online service to create additional texts if the computed similarity is greater than the threshold,
    wherein the first text comprises a user profile of the user in connection with the online service.

2. The method of claim 1, wherein the processing a first text into a first bag of words comprises processing each of a plurality of first texts into a first bag of words.

3. The method of claim 2, wherein the second bag of words comprises a plurality of second bags of words and the computing a similarity between the first bag of words and at least one second bag of words comprises computing a similarity between each of the first bags of words and a most similar one of the second bags of words.

4. The method of claim 3 further comprising computing an average of the similarities.

5. The method of claim 4, wherein the comparing the computed similarity with a threshold comprises comparing the computed average similarity with the threshold.

6. The method of claim 1, wherein the second bag of words is associated with a spam text.

7. Logic encoded in one or more non-transitory tangible media that includes code for execution and when executed by a processor is operable to perform operations comprising:
    processing a first text created by a user using an online service into a first bag of words, the first bag of words comprising a list of words that appear in the text, each of the words having associated therewith a number representing a number of times the associated word appears in the text;
    computing a similarity between the first bag of words and at least one second bag of words, wherein the computing comprises, for each word in the first bag of words, determining a compare count comprising a minimum number of times the word appears in each of the first bag of words and the second bag of words and adding the compare count to a sum of counts, wherein the computed similarity comprises two times the sum of counts divided by the total number of words in the first bag of words and the second bag of words;
    comparing the computed similarity with a threshold; and
    determining that the user is a spammer and preventing the user from using the online service to create additional texts if the computed similarity is greater than the threshold,
    wherein the first text comprises a user profile of the user in connection with the online service.

8. The logic of claim 7, wherein the processing a first text into a first bag of words comprises processing each of a plurality of first texts into a first bag of words.

9. The logic of claim 8, wherein the second bag of words comprises a plurality of second bags of words and the computing a similarity between the first bag of words and at least one second bag of words comprises computing a similarity between each of the first bags of words and a most similar one of the second bags of words.

10. The logic of claim 9 further comprising code that when executed by a processor is operable to perform operations comprising computing an average of the similarities.

11. The logic of claim 10, wherein the comparing the computed similarity with a threshold comprises comparing the computed average similarity with the threshold.

12. The logic of claim 7, wherein the second bag of words is associated with a spam text.

13. An apparatus, comprising:
    a server that includes a processor and a memory, wherein the apparatus is configured to:
        process a first text created by a user using an online service into a first bag of words, the first bag of words comprising a list of words that appear in the text, each of the words having associated therewith a number representing a number of times the associated word appears in the text;
        compute a similarity between the first bag of words and at least one second bag of words, wherein the computing comprises, for each word in the first bag of words, determining a compare count comprising a minimum number of times the word appears in each of the first bag of words and the second bag of words and adding the compare count to a sum of counts, wherein the computed similarity comprises two times the sum of counts divided by the total number of words in the first bag of words and the second bag of words;

compare the computed similarity with a threshold; and determine that the user is a spammer and preventing the user from using the online service to create additional texts if the computed similarity is greater than the threshold, wherein the first text comprises a user profile of the user in connection with the online service.

14. The apparatus of claim 13, wherein the processing a first text into a first bag of words comprises processing each of a plurality of first texts into a first bag of words and the second bag of words comprises a plurality of second bags of words and wherein the computing a similarity between the first bag of words and at least one second bag of words comprises computing a similarity between each of the first bags of words and a most similar one of the second bags of words.

15. The apparatus of claim 14 further comprising computing an average of the similarities.

16. The apparatus of claim 15, wherein the comparing the computed similarity with a threshold comprises comparing the computed average similarity with the threshold.

17. The apparatus of claim 13, wherein the second bag of words is associated with a spam text.

* * * * *